United States Patent
Wolf et al.

[11] Patent Number: 5,276,694
[45] Date of Patent: Jan. 4, 1994

[54] LASER OSCILLATOR

[75] Inventors: Jean-Pierre L. Wolf; Ludger H. Woeste, both of Berlin, Fed. Rep. of Germany

[73] Assignee: Elight Laser Systems GmbH, Teltow, Fed. Rep. of Germany

[21] Appl. No.: 887,347

[22] Filed: May 21, 1992

[51] Int. Cl.$^5$ .............................................. H01S 3/10
[52] U.S. Cl. ...................... 372/20; 372/23; 372/100
[58] Field of Search ............ 372/20, 100; 11/23

[56] References Cited

U.S. PATENT DOCUMENTS 5,053,641  10/1991  Cheng et al. .................. 372/20
5,088,096  2/1992   Pocholle et al. ............... 372/20

FOREIGN PATENT DOCUMENTS 2918863  11/1980  Fed. Rep. of Germany.

OTHER PUBLICATIONS

R. Konig, et al; "Small Line Width Nanosecond Dye Laser of High Spectral Purity with Double Functional Grating"; 1987; J. Phys. E. Sci. Instrum. 20; pp. 200–203.

Nguyen Dai Hung et al; "Tunable Alternative Double-wavelength Single Grating Dye Laser for Dial Systems"; May 15, 1988; Applied Optics, vol. 27, No. 10; pp. 1906–1908.

C. Kittrell et al.; "Simultaneous Tunable Two-wavelength Operation of Flashlamp Pumped Dye Lasers"; Oct. 1976; Optics Communications vol. 19, No. 1; pp. 5 and 6.

Primary Examiner—Georgia Y. Epps

[57] ABSTRACT

The invention relates to a laser oscillator for simultaneously or alternately producing several wavelengths. A tunable laser-active medium (3) is placed between several cavities or resonators (4; 1a, 1b ... 1n). The resonators (4; 1a, 1b ... 1n) are geometrically coupled by a polygonal prism (2), which allows a simultaneous operation or, by rotation of the prism (2) or some other movement of a beam deflection, an alternating operation.

17 Claims, 3 Drawing Sheets

LASER OSCILLATOR

BACKGROUND OF THE INVENTION

1. Field of the Invention

The invention relates to a laser oscillator and is based on a tunable laser for the simultaneous or alternating production of several wavelengths.

On the basis of numerous applications of tunable lasers with several wavelengths, such as multiphoton excitation, CARS (Coherent Antistokes Raman Scattering) or DIAL (Differential Absorption LIDAR), in the past various different laser configurations have been developed for simultaneously or alternately producing several wavelengths using the same laser system.

Among the hither to known processes there is no configuration permitting both the simultaneous and alternate operation without considerable efficiency losses.

2. Description of the Related Art

Simple beam displacement by a parallel plate, such as was described by Bréchignac et al in N. D. Hung, P. Bréchignac, Applied Optics, vol. 27, p. 1906, 1988, only permits alternating operation, which is additionally restricted by a long switching time.

The hitherto known arrangements suffer from the following disadvantages: greatly restricted selection possibility with regards to the different wavelengths and types of resonators or cavities (choice not independent, choice restricted to closely juxtaposed wavelengths, non-achromatism), imprecise determinability of the wavelengths, difficulties in adjusting the beams, different polarization directions, considerable losses due to insertion, or in the simultaneous operating mode instabilities and losses of efficiency as a result of the significant competition between the two emitted modes.

The problem of the invention is to use a tunable laser system for solving the aforementioned problems in the case of space and time superimposing of the different beams, whilst allowing a choice between the two operating modes without any modification to the arrangement.

This problem is solved by the features of the main claim, in conjunction with the appropriate features of the subclaims.

SUMMARY OF THE INVENTION

The inventive oscillator for the simultaneous or alternating production of several wavelengths comprises a tunable laser-active medium introduced between several resonators or cavities, which are geometrically coupled by a polygonal prism with parallel side faces, which allows a simultaneous operation or, by rotation and/or translation of the prism or some other beam deflection movement, an alternating operation.

The problems of the space and time superimposing of the different beams is eliminated with the invention, quite apart from the economic advantage provided by the use of a single tunable laser system.

The geometrical coupling of several laser resonators by a polygonal prism makes it possible to choose between the two operating modes without any modification to the arrangement.

The polygonal prism with lateral side faces leads to four important advantages compared with other beam division methods. There is no optical change to the beam in the resonator, because the beam displacement is parallel to the optical axis, which allows a choice of the dispersive elements, the type of resonators (also with filtering of the superradiance) and the wavelength without restrictions due to achromatic effects. The use of one edge of the prism permits the division of the incident beam into two parallel beams and therefore the simultaneous operation of two resonators and consequently the simultaneous emission of two wavelengths. The simultaneous operation is stable, because the division of the beam parallel to the incidence direction allows a simultaneous, but in the laser-active medium spatially separated existence of the two emission modes, so that competing amplification effects of the two wavelengths in the active medium are significantly reduced, so that it is possible to increase the tuning range of both resonators. As a result of a slight non-parallelism $\Delta\alpha$ on one or more sides of the polygonal prism (cf. FIG. 1C), it is possible to increase the number of divided beam components and consequently the available wavelengths. On passing through the bevelled side face of the prism as a result of the change to the incidence angle on the dispersive medium of the resonator, there is a displacement of the beam wavelength. For example, when using a rotary prism with a square cross-section and a side face bevelled by the angle $\Delta\alpha$ with which two resonators are geometrically coupled, four alternating wavelengths can be produced. Two wavelengths correspond to the setting of the dispersive elements of the two resonators and two other wavelengths slightly displaced with respect thereto due to the modification of the incidence angle. This arrangement is advantageous in the case of use in systems employing pairs of closely juxtaposed wavelengths, such as the differential absorption LIDAR (DIAL).

A basis for the invention is a polygonal prism with parallel side faces which, without changes, geometrically couples different laser resonators or cavities, without having the aforementioned disadvantages. The faces of the prisms are provided with an antireflection coating, to reduce the possibility of reflection losses. The number of surfaces is a compromise between the amplitude of the optical parallel displacement and the speed with which it is possible to alternate between the resonators by rotating the prism. Two regular polygons are particularly suitable as prisms, namely a prism with a square face for large optical displacements and a prism with a hexagonal face for high alternation speeds. Similar configurations can be brought about by reflection, double refraction, non-linear optical switching, plasma switching, pressure-reduced double refractive switching, acoustooptical switching or switching on fibre optic matrixes.

DESCRIPTION OF THE PREFERRED EMBODIMENTS

Figure 1A:
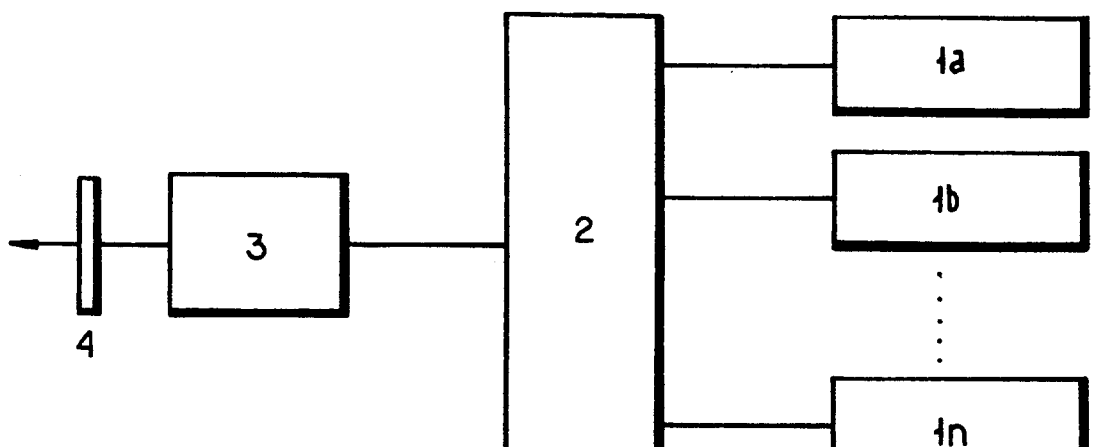
FIG. 1A A block circuit diagram of the operating principle of the invention.

The operating principle of the invention is shown FIG. 1A. The active medium 3 emits laser radiation of wavelengths determined by the resonators or cavities, i.e. by the outcoupling unit 4 and the dispersive elements 1a, 1b ... 1n, the resonators being simultaneously or alternately selected by the rotating polygonal prism 2. The prism with parallel faces produces a parallel displacement of the incident beam (FIG. 1B) with an amplitude $$D(\theta) = L \sin(\theta) \left\{ \sqrt{\frac{1 - \sin^2\theta}{N^2 - \sin^2\theta}} \right\}$$

Figure 1B:
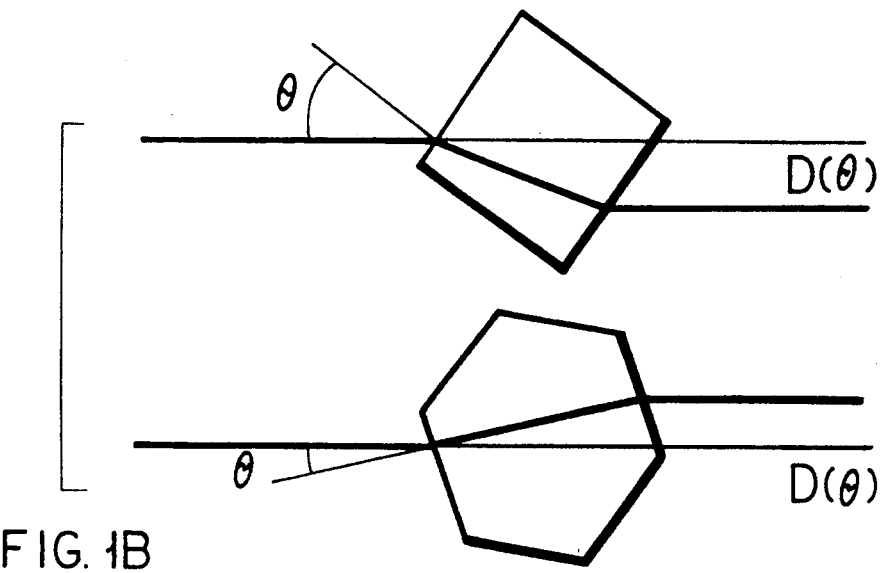
FIG. 1B Embodiments of the use of prisms with square or hexagonal faces.

(L being the distance between the parallel faces, $\theta$ the angle of incidence and N the relative refractive index $n_2/n_1$), which allows a geometrical selection of one or other dispersive element. The choice of resonator and therefore the choice of the emitted wavelength takes place either in alternating manner, e.g. by rotating the prism about its longitudinal axis, or simultaneously (FIG. 2). FIG. 1B shows the example of the most common prisms having hexagonal or square faces.

Figure 1C:
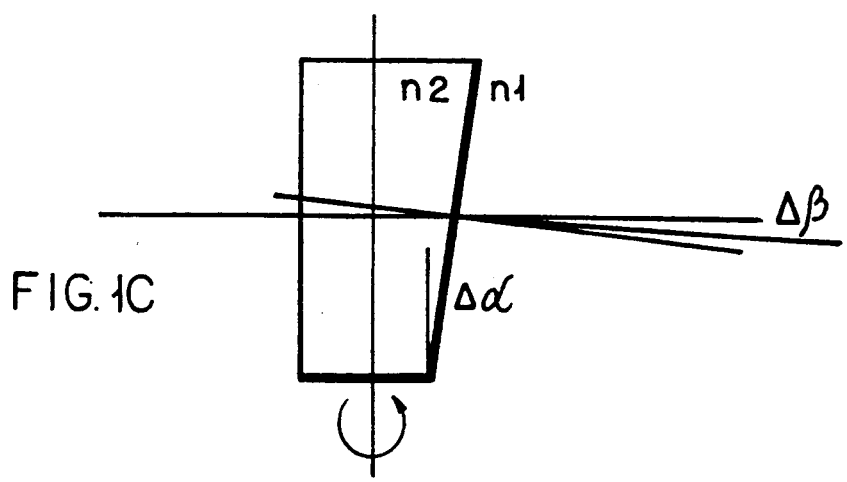
FIG. 1C The inclination of a face with respect to the rotation axis.

In order to obtain different pairs of closely juxtaposed wavelengths, one face is inclined slightly about an angle $\Delta\alpha$ relative to the rotation axis (FIG. 1C). The inclined side induces a fixed detuning of the output wavelength by modifying the incidence angle of the beam on the dispersive elements $1a ... 1n$ by a value $\Delta B = \Delta\alpha - A \sin (N \sin (\Delta\alpha))$. Thus, the same resonator emits two different wavelengths (fundamental wavelength and the displaced wavelength) as a function of the position of the rotating prism. If the beam passes through parallel faces then the fundamental wavelength is emitted, but if it passes through the faces inclined towards one another, the displaced wavelength is emitted. This difference can e.g. be modified by a pressure variation.

Figure 2A:
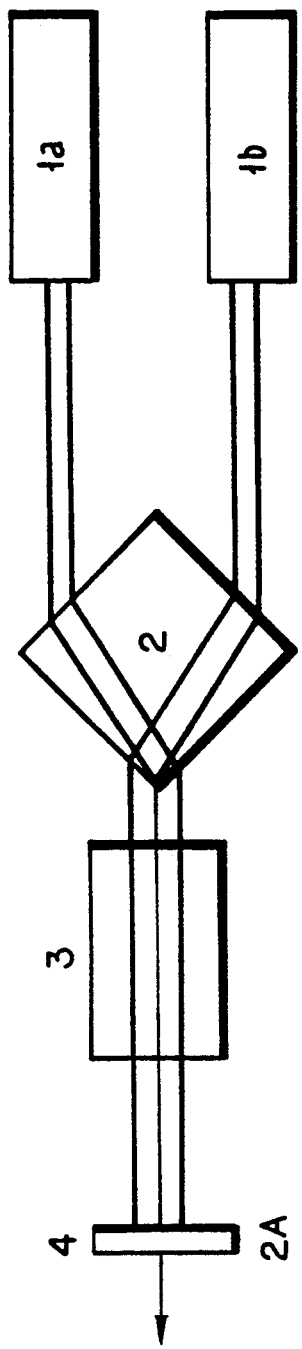
FIG. 2A The example of a prism with square faces of the operating principle of the simultaneous operating mode of the invention.

The operating principle of the simultaneous operating mode of the invention is illustrated in FIG. 2 using the example of a prism with square faces (FIG. 2A). The beam emitted by the active medium 3 is geometrically divided into two beams by the prism 2 and they are illuminated by resonators or cavities comprising the outcoupling unit 4 and the dispersive elements 1a or 1b. The outcoupling unit is diagrammatically represented by a partly reflecting mirror, but completely different radiation outcoupling forms are possible, such as e.g. reflection to one of the prisms of the resonator or on one edge. Laser emission now takes place simultaneously on two wavelengths, which are determined by the resonators.

FIG. 2A shows how the geometrical division by the stopped prism 2 takes place in the active medium, which prevents competition between the modes, so as to ensure an adequate tuning range for both resonators and a stable operation. The relative energy between the two wavelengths is set by fine adjustment of the position.

Figure 2B:
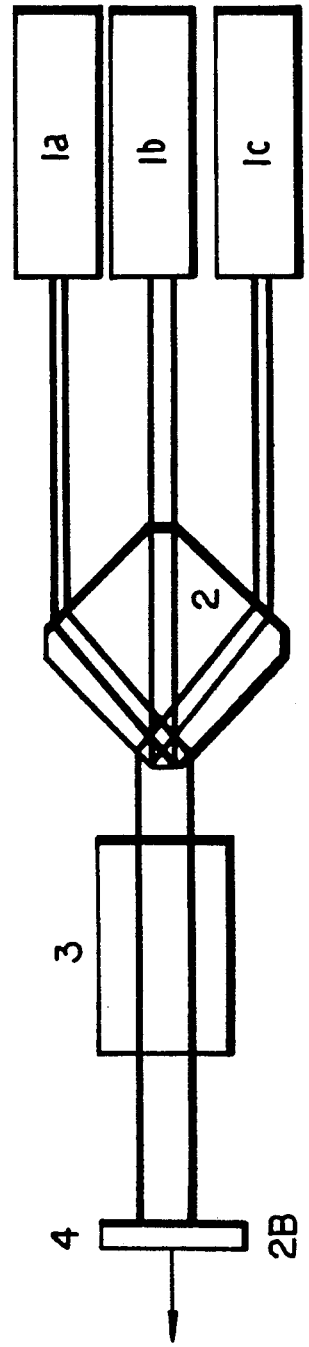
FIG. 2B The example of a prism with square faces and ground edges.

The fraction of the incident beam proportionally striking each of the two faces varies the Q factor of the two resonators and consequently favours one or other of said resonators. The fine adjustment of the relative energy between the wavelengths in particular allows the compensation of the different amplifications of the two wavelengths by the active medium. It is also possible to use irregular polygons, such as e.g. a prism with a square face, in which each edge is ground in such a way that for the four large parallel faces there are four further narrow parallel faces (FIG. 2B). If the laser beam is set to a cut edge, then it strikes three faces, which allows a separation into three beams and consequently a simultaneous emission of three wavelengths.

The moved prism can obviously also be divided in such a way that an etalon effect is obtained. As the setting angle of the rotation is relatively uncritical, whereas the transmission maximum of the etalon is very critically dependent on the setting angle, it is possible in this way to obtain a high-resolution adjustment during the prism rotation. An identical result can obviously be obtained through similar etalon effects occurring due to the vacuum deposition of an interference coating on the prism.

A spectral improvement is e.g. brought about by a common etalon for the different resonators (e.g. between the rotating prism and the outcoupling element). The completely independently selected wavelengths of the different resonators can be made to coincide with different modes of the etalon and consequently the spectral improvement of the different wavelengths is obtained.

To multiply the possible wavelength switching function it is possible to replace the prism by a fibre optic matrix.

A decisive advantage of the invention is the great flexibility relative to the choice of the active medium and the resonator type. Thus, the invention can be used for both solid state and gas lasers, which emit on numerous discrete lines, as well as for continuously tunable lasers such as dye lasers or vibronic solid state lasers ($Ti:Al_2O_3$, alexandrite, $Co:MgF_2$ ... ).

Figure 3:
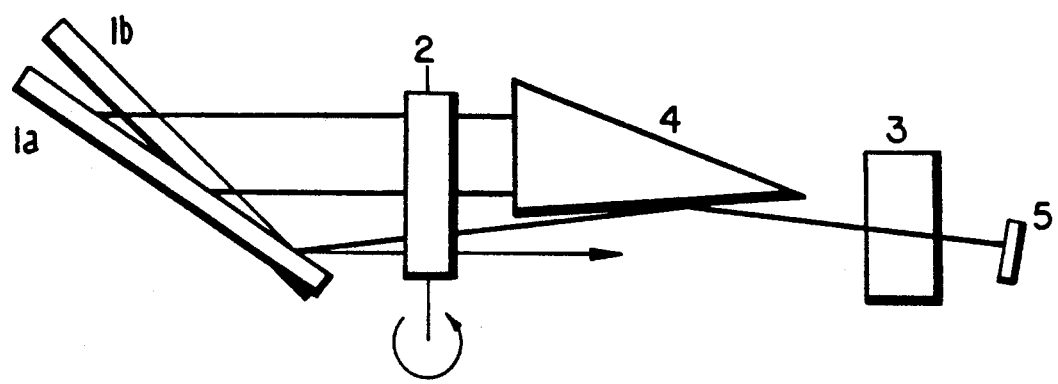
FIG. 3 The operation of the invention using a resonator with double grating reflection.
Figure 4:
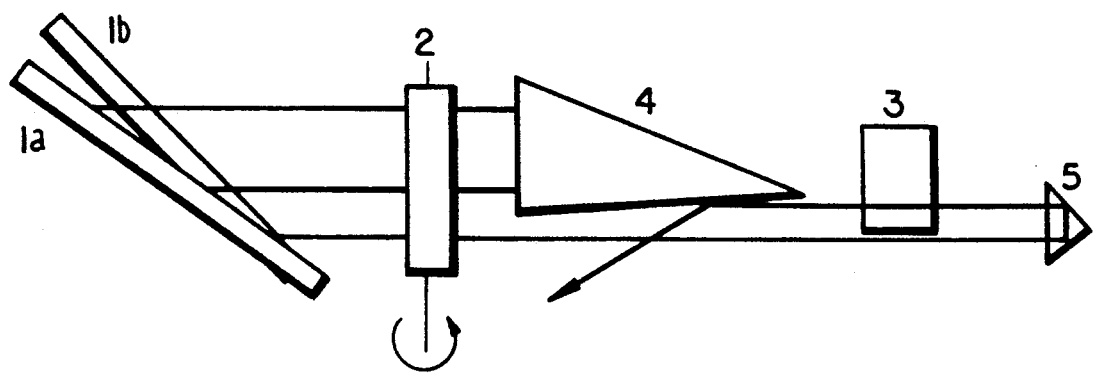
FIG. 4 The operation of the invention using a U-shaped resonator or cavity.

As a result of the parallel displacement of the beam all resonator or cavity types can be used. The elements 1a to 1n can comprise simple dispersive elements (prisms, etalons, double refraction filters, etc.) and a mirror at the end of the resonator, as well as gratings in standard configuration (Littrow, telescopic expansion, grazing incidence, etc.). Complex resonators, such as e.g. the resonator with the double grating reflection or the U-shape are particularly suitable. The latter resonator type is particularly attractive, because it allows an active suppression of superradiance (amplified spontaneous emission, ASE). FIGS. 3 and 4 show the operation of the invention in the case of the resonator with a double passage of the grating and in the case of a U-shaped resonator.

In the case of the laser oscillator with double grating reflection (FIG. 3), such as is used by LAMBDA PHYSIK (DE 2918863 C2), the active medium 3 is enclosed in a Littrow resonator comprising a resonator mirror 5, beam expander 4 and the grating 1. The outcoupling unit comprises the partial reflection on the face of one of the prisms of the beam expander. The laser emission is reflected a second time on the same grating. The incidence angle on the grating inside and outside the resonator are close together, so that the reflection acts as a filter for the ASE. The conversion of an oscillator into a laser with several geometrically coupled resonators, with the aid of the presently described invention is very simple. It is merely necessary to insert the polygonal, rotating prism between the active medium 3 and the different gratings 1a to 1n (only two gratings being shown in the drawing). The rotary prism can also be positioned between the beam expander and the active medium or between the gratings and the beam expander. Thus, simultaneously or in alternating manner, several wavelengths are obtained in the same way as with the configurations of FIGS. 1 and 2, but with a higher spectral purity.

In the case of the U-resonator (FIG. 4) the procedure is the same with the exception of the Porro prism 5 (or two mirrors), which replaces the rotor resonator mirror and consequently the resonator is formed from two reflections on the grating. The novel aspect is that the displacement of the beam by the polygonal prism takes place in parallel manner, so that no problems are caused by the insertion of the prism and the coupling of the resonators 1a to 1n.

We claim:

1. A multi-wavelengths laser oscillator with geometrically coupled resonators having a first mode for a simultaneous production of several wavelengths and a second operating mode for an alternating production of several wavelengths, and comprising an active medium, which emits in one emission mode on several discrete wavelengths and in a second emission mode emits a continuous spectrum and is inserted between several resonators, the alternating production being effected by rotation of polygonal prism, comprising said resonators are geometrically coupled to unfixed polygonal prism in such a way that at least on one edge and two surfaces of the polygonal prism for the realization of said simultaneous production.

2. Laser oscillator according to claim 1, wherein the polygonal prism used for radiation is slightly bevelled at least one side and consequently allows the production of different pairs of closely juxtaposed wavelengths and consequently by dividing the incident beam into three exiting beams permits the simultaneous operation of three different wavelengths.

3. Laser oscillator according to claim 1, wherein the coupled resonators comprise a common beam outcoupling and in each case an arrangement of dispersive prisms as the termination of the cavity.

4. Laser oscillator according to claim 3 in a Littrow arrangement. but with a common beam expander (4) for the different resonators, which only differ through different gratings (1a, 1b).

5. Laser oscillator according to claim 3, wherein said laser oscillator is a second reflection of the beam on the grating outside the oscillator in order to suppress superradiance, wherein the polygonal prism (2) brings about a double beam displacement.

6. Laser oscillator according to one of the claims 3 or 4, but with a second reflection of the beam on the grating outside the oscillator, in order to suppress the superradiance within the cavity (U-shaped), wherein the polygonal prism (2) brings about a double beam displacement.

7. Laser oscillator according to claim 3, wherein the outcoupling of the beam is brought about by partial reflection on a common element of the different cavities.

8. Laser oscillator according to claim 1, wherein said laser oscillator is accompanied by the additional use of a common etalon for the different resonators in order to reduce the line width, wherein each of the resonators is tuned to different modes of the etalon.

9. Laser oscillator according to claim 1, wherein the reflecting systems are formed by one of the group consisting of electrooptically switched systems and/or nonlinear optically switched systems and/or plasma switched systems and/or pressure-dependent, double refracting switching systems and/or acoustooptically switched systems.

10. Laser oscillator according to claim 1, wherein the prism (2) is replaced by a fibre optic matrix.

11. Laser oscillator according to claim 1 with a discrimination element integrated into the moving prism by splitting deposition and which by fine adjustment of the angle permits a fine setting of the laser wavelength with much higher resolution.

12. Laser oscillator according to claim 1, wherein the polygonal prism used for radiation is slightly bevelled on at least one side and consequently has flattened edges and consequently by dividing the incident beam into three exiting beams permits the simultaneous operation on three different wavelengths.

13. Laser oscillator according to claim 1, wherein the polygonal prism used for radiation is slightly bevelled on at least one side and consequently allows the production of different pairs of closely juxtaposed wavelengths and has flattened edges and consequently by dividing the incident beam into three exiting beams permits the simultaneous operation on three different wavelengths.

14. Laser oscillator according to claim 1, wherein the coupled resonators comprise a common beam outcoupling and in each case an arrangement of a double refracting filter and a mirror as the termination of the cavity.

15. Laser oscillator according to claim 1, wherein the coupled resonators comprise a common beam outcoupling and in each case an arrangement of dispersive gratings in a Littrow arrangement.

16. Laser oscillator according to claim 1, wherein the coupled resonators comprise a common beam outcoupling and in each case an arrangement of dispersive gratings in a Littman (i.e. grazing incidence) arrangement.

17. Laser oscillator according to claim 1 with a discrimination element integrated into the moving prism by vacuum deposition and which by fine adjustment of the angle permits a fine setting of the laser wavelength with much higher resolution.

* * * * *